United States Patent
Huang et al.

(10) Patent No.: US 12,150,076 B2
(45) Date of Patent: Nov. 19, 2024

(54) SYNCHRONISATION SIGNALING FOR INTEGRATED ACCESS AND BACKHAUL NODES

(71) Applicant: Telefonaktiebolaget LM Ericsson (PUBL), Stockholm (SE)

(72) Inventors: Yezi Huang, Täby (SE); Erik Dahlman, Stockholm (SE); Boris Dortschy, Hägersten (SE); Lei Bao, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 410 days.

(21) Appl. No.: 17/765,735

(22) PCT Filed: Oct. 4, 2019

(86) PCT No.: PCT/SE2019/050965
§ 371 (c)(1),
(2) Date: Mar. 31, 2022

(87) PCT Pub. No.: WO2021/066690
PCT Pub. Date: Apr. 8, 2021

(65) Prior Publication Data
US 2022/0346046 A1    Oct. 27, 2022

(51) Int. Cl.
*H04W 56/00* (2009.01)
*H04B 7/06* (2006.01)
*H04B 7/08* (2006.01)

(52) U.S. Cl.
CPC ...... *H04W 56/0015* (2013.01); *H04B 7/0695* (2013.01); *H04B 7/088* (2013.01)

(58) Field of Classification Search
None
See application file for complete search history.

(56) References Cited

U.S. PATENT DOCUMENTS

| | | |
|---|---|---|
| 2018/0049190 A1 | 2/2018 | Abedini et al. |
| 2019/0150213 A1 | 5/2019 | Kim |
| 2020/0037385 A1* | 1/2020 | Park ............... H04W 56/001 |

(Continued)

OTHER PUBLICATIONS

PCT International Search Report issued for International application No. PCT/SE2019/050965—Jul. 3, 2020.

(Continued)

*Primary Examiner* — Diane L Lo
(74) *Attorney, Agent, or Firm* — Baker Botts L.L.P.

(57) ABSTRACT

There is disclosed a method of operating an Integrated Access and Backhaul (IAB) node (200, C, N3) in a wireless communication network, the IAB node being in a communication link with a second IAB node using a signaling beam, the IAB node further being scheduled to perform beam sweeping with a plurality of synchronisation beams, one of the synchronisation beams corresponding to the signaling beam; wherein a synchronisation beam is scheduled to carry synchronisation signaling; and wherein the method comprises performing beam sweeping such that the synchronisation beam corresponding to the signaling beam carries information signaling replacing the synchronisation signaling at least in part. The disclosure also pertains to related methods and devices.

12 Claims, 9 Drawing Sheets

(56) References Cited

U.S. PATENT DOCUMENTS

2021/0345262 A1* 11/2021 Harada ............... H04W 56/001
2023/0146103 A1* 5/2023 Cheng .................. H04L 5/0094
370/252

OTHER PUBLICATIONS

PCT Written Opinion of the International Searcing Authority issued for International application No. PCT/SE2019/050965—Jul. 3, 2020.

* cited by examiner

SYNCHRONISATION SIGNALING FOR INTEGRATED ACCESS AND BACKHAUL NODES

PRIORITY

This nonprovisional application is a U.S. National Stage Filing under 35 U.S.C. § 371 of International Patent Application Serial No. PCT/SE2019/050965 filed Oct. 4, 2019 and entitled "Synchronisation Signaling For Integrated Access and Backhaul Nodes" which is hereby incorporated by reference in its entirety.

TECHNICAL FIELD

This disclosure pertains to wireless communication technology, in particular in the context radio access technologies.

BACKGROUND

For radio access networks, radio nodes are connected to a core network, to allow communication between terminals in different cells provided by different radio nodes. The radio nodes are usually connected to the core network by wire or cable, in particular via optical fibre. However, it is not always practical or feasible to arrange such a land-bound connection. For such cases, there may be employed relay nodes or nodes for integrated access and backhaul (IAB). An IAB node may on the one hand provide radio access to terminals or user equipments (UEs), and on the other hand may communicated to a parent (IAB) node via radio technology, to be relayed or routed to a core network, e.g. via a donor node. Due to sharing time/frequency resources with terminals and other nodes, the use of IAB nodes requires new approaches of managing resources and node behaviour.

SUMMARY

It is an object of the present disclosure to provide approaches facilitating improved IAB handling, in particular regarding the downlink timing of a (child) IAB node.

The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is disclosed a method of operating an Integrated Access and Backhaul (IAB) node in a wireless communication network. The IAB node is in a communication link with a second IAB node using a signaling beam. The IAB node further is scheduled to perform beam sweeping with a plurality of synchronisation beams, one of the synchronisation beams corresponding to the signaling beam, wherein a synchronisation beam is (in general) scheduled to carry synchronisation signaling. The method comprises performing beam sweeping such that the synchronisation beam corresponding to the signaling beam carries information signaling replacing the synchronisation signaling at least in part.

Moreover, an Integrated Access and Backhaul (IAB) node for a wireless communication network is considered. The IAB node is adapted for communicating in and/or using a communication link with a second IAB node using a signaling beam. The IAB node further is adapted for being scheduled to perform beam sweeping with a plurality of synchronisation beams, one of the synchronisation beams corresponding to the signaling beam, wherein a synchronisation beam is scheduled to carry synchronisation signaling. The IAB node is further adapted for performing beam sweeping such that the synchronisation beam corresponding to the signaling beam carries information signaling replacing the synchronisation signaling at least in part.

The beam carrying information signaling replacing synchronisation signaling may be considered to be a synchronisation beam as it may still carry part of the synchronisation signaling and/or has the transmission characteristics (e.g., beam shape and/or precoder and/or spatial angular extension, etc.) of the synchronisation beam. Information signaling replacing synchronisation signaling may correspond to replacing information normally included into synchronisation signaling with other information; the signaling characteristics (e.g., modulation and/or (error) coding and/or existence and/or location of demodulation reference signaling) may be the same or different between synchronisation signaling or information signaling. An IAB node may schedule itself for beam sweeping, e.g. based on a configuration and/or predefined and/or programmed parameters), and/or may be scheduled or configured by another IAB node, e.g. a parent node or IAB donor node.

The information signaling replacing the synchronisation signaling may be referred to as replacement signaling; analogously, the information replacing information of the synchronisation signaling may be referred to as replacement information. The replacement information and/or replacement signaling may be beam-specific and/or communication link-specific and/or node-specific. Beam-specific information or signaling may be information pertaining to the signaling beam and/or a transmission beam used by the second IAB node in the communication link; communication link-specific information or signaling may pertain to the communication link, e.g. a beam pair and/or link specific timing; node specific information or signaling may pertain to the IAB mode and/or the second IAB node. Replacement information and/or signaling may in particular pertain to timing and/or power (e.g., transmission power). Replacement information may represent measurement information and/or instructions or proposals for the second IAB node, e.g. for future operation and/or link characteristics. The information signaling may replace some of the synchronisation signaling, or all of it. The synchronisation signaling may be associated to a resource structure; resource elements or subsets of resources of the resource structure (or all of the resource structure) may be used for transmitting replacement signaling and/or replacement information. Replacement information or signaling may comprise coding, e.g. error coding information, in some variants.

The approaches described herein allow efficient use of signaling, as synchronisation signaling on or corresponding to an existing IAB communication link may be rather redundant; it may for example be assumed that the communication links between IAB nodes are likely to be quite stable, as IAB nodes are not expected to be highly mobile in most cases. Thus, some information normally indicated with synchronisation signaling may be replaced, reducing the necessity to provide other signaling to provide the replacing information, limiting overall signaling overhead.

It may be considered that the communication link comprises a beam pair comprising the signaling beam and a corresponding reception beam (used by the receiving/second radio node. The communication link may be established based on previous signaling, e.g. previous synchronisation signaling and/or reference signaling. Thus, a beam setup that has shown itself to be reliable may be exploited for providing the replacement information.

The synchronisation signaling may correspond to and/or comprise SS/PBCH block signaling. Such signaling is particularly suitable for NR, e.g. in frequency ranges below 28 GHZ or below 60 or 71 GHz, and/or for OFDM-based signaling (transmitted by the IAB node). However, SC-FDM based signaling or more generally Single Carrier-based signaling may be considered, e.g. in high frequency ranges, e.g. above 28 GHz or 71 GHz. Thus, in some scenarios, different synchronisation signaling structures may be considered.

It may be considered that the information signaling is transmitted on a resource structure corresponding to a resource structure used for synchronisation signaling. The resource structure may represent and/or comprise and/or consist of a set of resource elements, e.g. with subsets associated to different types of signaling or information and/or physical channels or signals. For example, one subset may be associated to PSS and/or one to SSS and/or one to DM-RS and/or one to PBCH. The replacement signaling may replace one or more subsets, e.g. providing replacement information (optionally with coding bits) on resource elements of the replaced subset.

It may be considered that the information signaling indicates timing information, e.g. timing information pertaining to the communication link and/or to a southbound link of the IAB node. In general, such timing information may indicate a deviation and/or fine-tuning, and/or may pertain specifically to the communication link and/or IAB node (or pair of IAB node and second IAB node), in contrast to general or cell-wide timing provided by synchronisation signaling, e.g. PSS and/or SSS. Timing information may indicate a timing advance (e.g., indicating a shift in transmission time to synchronize reception of signaling from multiple sources) and/or a timing shift for IAB communication (T_delta). The timing information may pertain to a MT function, or a DU function, and/or may indicate a misalignment between MT and DU functions.

In some variants, the information signaling may replace primary synchronisation signaling and/or secondary synchronisation signaling and/or demodulation reference signaling and/or broadcast channel signaling. Such replacement may be according to subsets of resource elements. Thus, information may be selectively replaced, while other information may optionally be kept, e.g., if considered helpful for operation.

In some cases, the information signaling may indicate power control information. The power control information may for example indicate a target signal strength and/or signal quality (e.g., target SINR/SIR/SNR), for example for a power control loop like an outer loop, and/or a relative shift in power (e.g., Transmit Power Control command), and/or a power offset or power base value (e.g., a value p0). The power control information may pertain to a MT function and/or DU function and/or access link and/or backhaul link. The communication link may in general comprise aspects of access link and backhaul link, e.g. associated to different functions like MT and/or DU and/or CU. A relative shift may be indicated as one of a set of possible steps, which may comprise 4 or more different values, e.g. 8 or 16 different values. The different values and/or set size may be predefined or configured or configurable, e.g. by a parent node and/or the donor node. The power control demands for IAB nodes may be on different timescales and thus may be covered thusly.

It may be considered that the information signaling may transmitted using the same modulation as the synchronisation signaling. Thus, the receiver and/or transmitter do not have to change their settings during the procedure.

In some variants, the information signaling indicates a resource misalignment parameter. The misalignment parameter may for example indicate a misalignment between access link and/or backhaul link, and/or MT and DU functionality, and/or pertaining to the communication link. The misalignment may pertain to timing and/or power and/or signal quality and/or signal strength. A misalignment may for example indicate that a threshold deviation or difference or ratio has been reached, and/or indicate the amount of misalignment.

The IAB node may be configured to transmit the information signaling, e.g. by a parent IAB node and/or an IAB donor node and/or a control function entity, e.g. a CU. In some cases, transmitting the information signaling may comprise configuring the second IAB node to receive the information signaling (e.g., configuring by the IAB node), and/or be based on the second IAB node being configured to receive the information signaling, e.g. by a parent node of the second IAB node and/or the IAB donor node. It may generally be considered that all IAB nodes connected or dependent on the same IAB donor node are configured and/or adapted similarly.

The second IAB node may be adapted to receive the information signaling when it has a reception occasion, e.g. when it is not transmitting synchronisation signaling itself.

There may be considered a receiving IAB node (also referred to as second IAB node), which may be adapted to receive information signaling transmitting by a (first) IAB node replacing synchronisation signaling. A corresponding method may be envisioned.

The IAB node may comprise, and/or be adapted for utilising, processing circuitry and/or radio circuitry, in particular a transceiver and/or transmitter and/or receiver, for communicating and/or transmitting, in particular of the replacement signaling and/or synchronisation signaling. A receiving IAB node may comprise, and/or be adapted for utilising, processing circuitry and/or radio circuitry, in particular a receiver and/or transceiver and/or transmitter, for communicating and/or receiving, in particular the replacement signaling.

It may be considered that the synchronisation signaling is additional SS/PBCH block signaling. This signaling is particularly useful in an IAB scenario.

The Integrated Access and Backhaul (IAB) node may be a child IAB node. The IAB node may be connected or connectable to a first parent IAB node via a first backhaul link, and/or may be adapted to communicate with one or more child nodes.

There is also considered a program product comprising instructions adapted for causing processing circuitry to control and/or perform a method as described herein. A carrier medium arrangement carrying and/or storing a program product disclosed herein is proposed.

To each signaling beam there may be associated a corresponding partner beam associated to the communication partner (e.g., other radio node or wireless device, in particular IAB node). Selecting a signaling beam may comprise selecting a partner beam and/or a beam pair, and/or indicating to the partner the partner beam and/or beam pair, e.g. with dynamic and/or semi-static control signaling. In general, different sets of signaling beams and/or different selected signaling beams may be associated to different communication partners and/or targets, e.g. different wireless devices. In general, a signaling beam may be a beam carrying and/or intended for and/or used for transmitting and/or receiving data signaling, e.g. on an associated (physical) data channel or associated data channels, e.g. PDSCH and/or PUSCH.

In general, a beam like a signaling beam or synchronisation beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam of the sweeping beams is produced by hybrid beamforming, e.g. by analog beamforming performed on a beam representation or beam formed based on digital beamforming.

Beam sweeping may comprise transmitting one or more synchronisation beams into different directions, e.g. to cover the extension of a cell or cell section, and/or to provide synchronisation signaling for the cell or cell section. Beam sweeping may comprise transmitting one or more beams simultaneously, and/or providing different beams at different time instances. Beam sweeping may be performed such that the synchronisation beams are transmitted in a beam sweeping or synchronisation time interval or transmission timing structure, e.g. a slot or subslot. There may be periodic synchronisation time intervals for transmission of synchronisation signaling (beam sweeping may be considered to represent transmission of synchronisation signaling in this disclosure). It may be considered providing additional synchronisation signaling at occurrence shifted in time from regular periodic synchronisation signaling, e.g. for the IAB system and/or other IAB nodes.

A synchronisation beam may be a beam comprising and/or carrying reference signaling like synchronisation signaling, e.g. SS/PBCH block signaling. A synchronisation beam may be transmitted over a time interval, in particular a transmission timing structure, like a slot or slot sequence or subslot or subslot sequence. A synchronisation beam may comprise and/or carry one or more occurrences of synchronisation signaling, e.g. the same signaling, for example in the form of one or multiple bursts. A synchronisation beam may comprise and/or be intended to comprise signaling allowing synchronisation and/or cell identification and/or provide broadcast information and/or allow measurements, e.g. for signal strength and/or signal quality. A signaling beam may comprise signaling like control signaling and/or data signaling and/or reference signaling. A signaling beam may be a transmission beam, or in some cases a reception beam. A signaling beam may be considered to correspond to a synchronisation beam if they have one or more shared characteristics and/or essentially have a same beam shape and/or directional angle (e.g., of the main lobe, or lobe targeting the second IAB node or radio node) and/or spatial angular extension, and/or share the same precoder, and/or at least partly overlap in spatial angular extension and/or shape (e.g. at least partly overlap regarding the main lobe), and/or cover the same target and/or targets, in particular the second IAB node or radio node (e.g., using directional angle and/or shape and/or spatial angular extension and/or precoder to achieve such coverage). The signaling beam's shape and/or spatial angular extension and/or direction may be based on the synchronisation beam and/or a reference beam, e.g. adapted based on measurement reports pertaining to signaling received by the second IAB node or radio node with a synchronisation beam (e.g., synchronisation signaling) or a reference beam (which may comprise other reference signaling than synchronisation signaling, e.g. CSI-RS signaling or phase tracking RS or tracking RS).

The synchronisation signaling may for example be SS/PBCH signaling or SSB. The synchronisation signaling may be beamformed, and/or reception of the signaling may be performed with a reception beam or more than one reception beams (e.g., receiving multiple transmission beams and/or covering multiple signaling paths). The synchronisation signaling may be according to a transmission pattern, which may be periodical with one or more interruptions in the pattern. The synchronisation signaling may in particular additional synchronisation signaling, which may be transmitted shifted in time domain relative to periodic synchronisation signaling, the latter of which may have a periodicity of for example 10 ms, 20 ms, 40 ms or 80 ms; additional synchronisation signaling may be according to a transmission pattern with transmission occasions interspersed between transmission occasions for such synchronisation signaling. A group of IAB nodes may transmit additional synchronisation signaling such that each transmission occasion at least one of the IAB nodes transmit additional synchronisation signaling; each IAB node may at some occasions receive instead of transmitting, such that each IAB node may have an individual transmission pattern and/or reception pattern. The reception pattern may correspond to occasions in which IAB nodes associated to the same IAB donor transmit synchronisation signaling, while the IAB node receiving synchronisation signaling is not transmitting. The IAB node may generally operate in half-duplex mode, e.g. either transmitting synchronisation signaling or receiving. A transmission or reception occasion may pertain to a time domain interval covering one or more symbols, and/or one synchronisation signaling instance, which may comprise one or more SS/PBCH blocks and/or one or more burst, which may be continuous in time, or separated.

A communication link may be a backhaul link or access link. A communication link from an IAB node to one or more child nodes may have a downlink timing determined as described herein.

A backhaul link, e.g. a first and/or second backhaul links may be in a set of parent backhaul links to a number of parent node larger than two. Any link-specific parameter mentioned may pertain to one of the link provides by a parent of the set. A backhaul link from a parent IAB node (also referred to as parent node) may be controlled regarding timing and/or synchronisation by the parent, e.g. via DCI signaling and/or SS/PBCH block signaling, in particular with signaling indicating timing advance and/or timing advance adjustment, and/or primary and/or secondary synchronisation signaling. Alternatively, or additionally, the backhaul link may be power-controlled by the parent node, e.g. via TPC commands in DCI. In general, the parent node may control physical layer aspect of communication with a child node (the IAB node) with suitable control signaling, e.g. DCI signaling. A backhaul link may generally be a wireless connection between network nodes (IAB nodes), over which signaling from a (wireless or radio) access link or another backhaul link may be carried or transported or routed, e.g. to another IAB node. In particular, signaling between a terminal not in direct radio access with a donor node may be carried over one or more backhaul links. The backhaul links may be in mm-wave ranges. It may be considered that backhaul link and access links are in different frequency ranges and/or carriers. For example, access links may be lower in frequency, e.g. below 6 GHz. Backhaul links may share a frequency range and/or carrier and/or carrier aggregation.

Providing a communication link may comprise providing a cell and/or uplink and/or downlink communication for the link, e.g. for access and/or backhaul. The IAB node may provide power control and/or timing and/or synchronisation for a child (e.g., terminal or IAB child node) on the communication link it provides. Providing a communication link may comprise transmitting and/or receiving signaling on the link, based on the communication timing. The timing for transmission and reception on the communication may be linked, e.g. based on distance to the communication partner and/or timing advance or timing advance adjustment for the communication partner (e.g., a terminal, if it is an access link, and an IAB node if it is a backhaul link). In general, the communication timing may be used for multiple communication links provided by the IAB node, e.g. an access link and/or one or more backhaul links. An access link may pertain to a cell, or more than one cell, provided by the IAB node, which may allow radio access for a plurality of terminals. A backhaul link may be device-specific, e.g. with strong beamforming to a stationary child node.

A donor node may generally be an IAB node with higher-layer control functionality, and/or an IAB node with a cable connection to a core network, e.g. via fibre or wire. The donor node may provide synchronisation via synchronisation signaling, e.g. SS/PBCH block signaling, synchronising its child nodes, which then provide similar synchronisation to their child nodes, etc. Each synchronisation step may be based on the parent synchronisation, such that in general, the whole IAB arrangement connected to one donor may be similarly synchronised. It should be noted that individual transmission and reception timing may be based on the synchronisation, but may be shifted, e.g. due to delay and/or signal travel time effects, which may be accommodated for e.g. via timing advance and/or timing advance adjustment functionality. Also, the synchronisation may be considered to pertain to the physical layer, e.g. in regard to the timing grid used. When specific signaling is transmitted on this grid may be determined on a higher layer, e.g. by a scheduler and/or the MAC or higher layer.

The IAB node may be connected, or adapted to be connected or connectable, to a plurality N of parent nodes via associated backhaul links, e.g. with corresponding timings. Thus, complex IAB node arrangement with high levels of redundancy and/or high data throughput may be provided. The communication timing may in general be based on the number of parent nodes of the IAB node, and/or hop-count of a parent. The hop-number may indicate the number of backhaul links signaling has to go over from a terminal on an access link of the IAB node to the donor. Links with lower hop-count may be weighed higher than links with higher hop-count. For example, a weight may be dependent on 1/HC, with HC the hop-count of a link or associated to a parent. It should generally be considered that each parent may be associated to one backhaul link to the IAB node.

A program product comprising instructions adapted for causing processing circuitry to control and/or perform any method described herein may be considered. Also, there is described a carrier medium arrangement carrying and/or storing such a program product.

The approaches described herein allow use of a downlink timing considering influence from multiple parents, which is particularly suitable for a multi-parent IAB arrangement. In particular, the timing accommodates for different operational conditions on different links with different parents, and provides a stable environment, even if communication is relayed or routed over different links or paths at different times.

In the context of this disclosure, a backhaul link to a parent may be referred to as UL backhaul link, a backhaul link to a child may be referred to as DL backhaul link. For each backhaul link, there may be communication in both directions, from parent to child and reverse. Communication on a backhaul from child to parent may be considered UL communication, or UL component of the backhaul link, and from parent to child may be considered DL communication, or DL component of the backhaul link. Thus, for an IAB node with an UL backhaul link, UL communication goes from the IAB node to a parent node, and DL communication from parent to the IAB node, for this backhaul link. For a DL backhaul link, UL communication would go from the child to the IAB node, and DL communication from the IAB node to the child, for the backhaul link. An analogous terminology may be used for an access link, providing radio access to terminals. In some cases, the connection from a child to a parent may be referred to as northbound, the connection from a parent to a child as southbound.

An IAB node may be logically divided in a mobile terminal (MT) functional part and a network node (gN) functional part. A backhaul link may comprise corresponding parts. The MT part may provide communication with parent nodes based on and/or similar to UE-type radio access, and/or provide termination for associated interface/s and/or protocol layer/s. The network node part may provide communication with UEs and/or child nodes, and/or higher layer communication with other IAB nodes, and/or provide termination for associated interface/s and/or protocol layer/s. The network node part may be logically subdivided into a DU part and a CU part, which may be associated to different layers of the protocol stack. It may be considered that network node functionality and UE functionality are provided by different radio circuitries, which may be operable separately and/or independent of each other.

In general, an IAB node may be expected to communicate in half-duplex mode. In half-duplex mode, it may either transmit or receive, e.g. for a given functional part or for all functional parts. For example, it may operate either as network node (gNB functionality) or as mobile terminal (UE functionality) at any given point in time. This significantly limits the amount of self-interference of a node, in particular in context of the significantly different capabilities and power characteristics between UEs and gNB, respectively associated functionality of IAB nodes. However, this leads to certain limitations on IAB nodes. For example, an IAB node has to provide types of broadcasts and/or reference signaling like synchronisation signaling (in particular SS/PBCH blocks), e.g. to enable random access for UEs. Transmission of such signaling usually is synchronised over networks and/or network nodes and usually occurs with a given synchronisation periodicity, e.g. one of 10 ms, 20 ms, 40 ms, 80 ms. An IAB node that transmits such signaling thus cannot receive the SS/PBCH blocks provided by other IAB nodes (e.g., parent node/s and/or potential parent node/s). To enable an IAB node to receive such signaling, additional SS/PBCH signaling may be scheduled (e.g., by a donor node and/or CU functionality) for IAB nodes, which may occur inside the intervals of the synchronisation periodicity intervals. This additional SS/PBCH signaling may be at timing occasions and/or patterns that are different for different IAB nodes. In particular, the additional signaling may be scheduled such that at certain occasions, an IAB node can receive the additional signaling from other IAB nodes, without having to transmit it itself.

The synchronisation signaling (e.g., SSB or SS/PBCH block) provided by IAB nodes in general may be the same (e.g., to provide cell extension) or different, e.g. if each IAB node has its own cell with its own cell ID (the cell ID may be encoded in the synchronisation signaling, e.g. PSS and/or SSS). The synchronisation signaling may in general comprise a master information block and/or one or more system information blocks, and/or indicate a cell ID like a physical cell ID and/or information about numerology and/or carrier and/or timing and/or bandwidth part (e.g., initial bandwidth part) and/or search space for control signaling (e.g., for receiving DCI indicating on which resources a PDSCH transmission carrying remaining minimum system information like system information blocks is transmitted) used, and/or indicate information regarding random access, e.g. random access occasions and/or random access preamble format/s. In general, the synchronisation signaling may comprise distinct parts, e.g. primary synchronisation signaling (PSS) and/or secondary synchronisation signaling (SSS) and/or broadcast information (PBCH) and/or demodulation reference signaling (DMRS).

BRIEF DESCRIPTION OF THE DRAWINGS

The drawings are provided to illustrate concepts and approaches described herein, and are not intended to limit their scope. The drawings comprise.

DETAILED DESCRIPTION

In the following, variants are described in the context of NR, however, the approaches may be implemented in different contexts.

Figure 1:
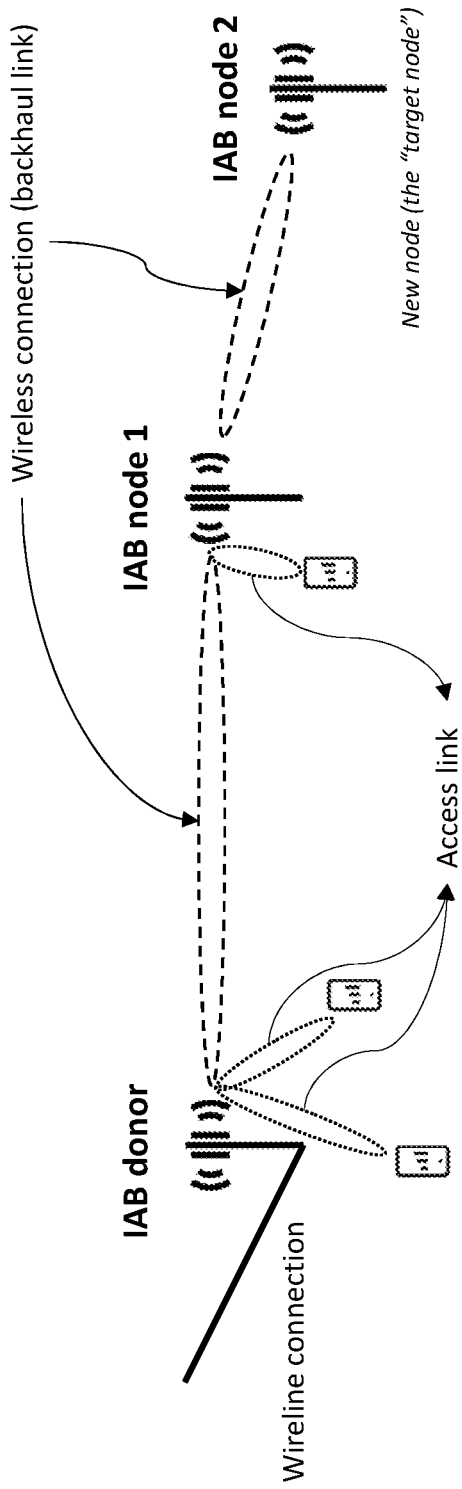
FIG. 1, showing an exemplary IAB arrangement.

FIG. 1 shows an exemplary setup of a backhaul arrangement. An IAB donor node (also referred to as donor) may be connected to a core network via a wireline connection (cable or fibre, e.g.). It provides radio access for terminals, and a wireless connection to another network node, an IAB node 1. The IAB node 1 also provides radio access for terminals (via an access link), and communicates to the donor via a wireless connection providing a backhaul link. Moreover, it provides a backhaul link to an IAB node 2. FIG. 1 thus shows a multi-hop arrangement, wherein communication via IAB node 2 passes via two backhaul links until it reaches the IAB donor. In general, an IAB node may be any node that is adapted for providing radio access to one or more terminals/UEs (via access links), and also may access and/or provide one or more backhaul links. A backhaul link may generally be provided to route and/or forward communication from or to a terminal to another IAB node, e.g. using radio signaling. Backhaul and access links may in general use the same or different resource structures. In particular, they may operate on the same carriers and/or carrier aggregations. The carriers used may in particular be mm-wave carriers, e.g. above 6 GHz or 20 GHz or 30 GHz in frequency. For each IAB node, each backhaul link terminated at an IAB node to be used to reach a donor may be counted as one hop. For example, an IAB node connected to a donor directly with a backhaul link would have a hop-count of 1, IAB node 2 in FIG. 1 has one of 2. For multiple-parent scenarios, different paths to a donor may have different hop-counts, or the same, depending on the arrangement.

Figure 2:
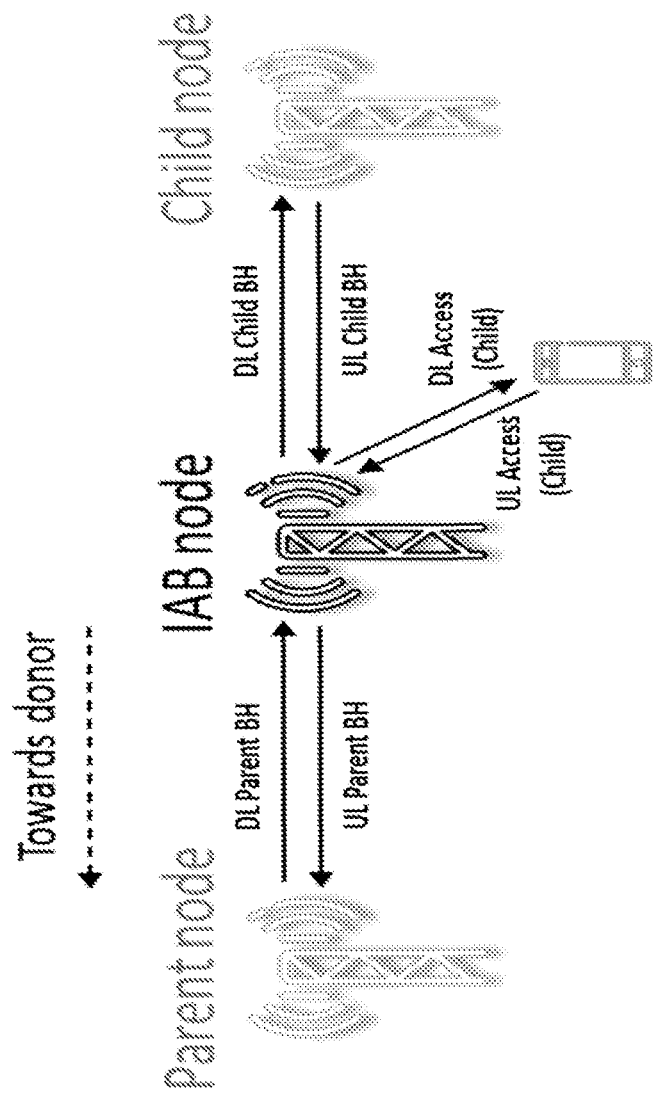
FIG. 2, showing another exemplary IAB arrangement.

FIG. 2 shows a different view of an IAB arrangement. From an IAB nodes point of view, it may be connected via a backhaul (BH) link to a parent node, which may be closer to the donor node (or be the donor node itself) in terms of backhaul links needed to reach the donor. Each backhaul link may comprise an UL component and DL component, which may for example be in TDD or FDD operation. In UL, communication may be transmitted in the direction of the donor. In DL, communication may be from the donor, e.g. to a terminal connected to the IAB node, or another IAB connected via another backhaul link. A device to which an IAB node provides radio access, either via an access link or backhaul link, may be considered a child node. An IAB node may in general process information received via an access link or backhaul link, e.g. to route its content to a target terminal or other IAB node or donor. It may be considered that an IAB node (e.g., as parent node) provides and determines control signaling on the access and/or backhaul links it provides. The control signaling may in particular be physical layer control signaling, e.g. DCI signaling, in particular for scheduling and/or power control and/or timing. Some IAB nodes, in particular a donor node, may be adapted to also provide higher-layer control, in particular RRC layer control.

In general, it may be assumed that an IAB node is aware of its children and parents (IAB children and parents). In particular, it may be aware of all IAB nodes reachable via a backhaul link it provides itself (e.g., children of children, or more distant children). It may be aware of higher-layer parents like grandparents, but in some cases not, as it may be adapted to follow control signaling by its direct parent. A parent of a parent may be considered a grandparent, a child of a child a grandchild, etc. A donor may be aware of all IAB nodes reachable via backhaul links provided by the donor, e.g. all children. This may be due to installation, or automatic communication between nodes when setting up.

Figure 3:
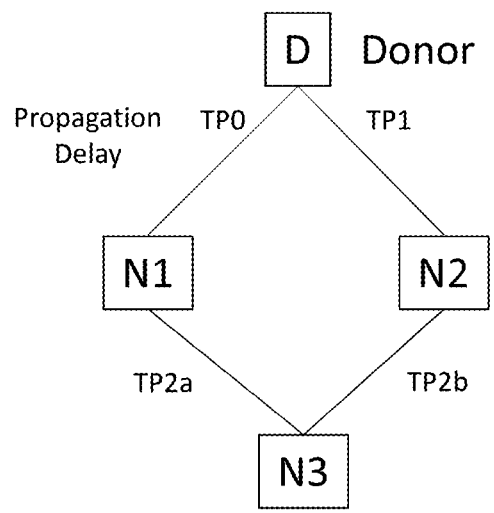
FIG. 3, showing a scenario with multiple IAB parents.

FIG. 3 shows another scenario for an IAB arrangement. A donor D is connected via backhaul links to two IAB nodes N1 and N2. D may be considered parent to N1 and N2. Another IAB node N3 may be connected to N1 and N2 via respective backhaul links, such that it may be considered to have multiple parents. It may be assumed that propagation delays of signaling differ between backhaul links, such that the delays TP0, TP1, and in particular TP2a and TP2b may be different. It should be noted that for a terminal connected to N3 via an access link, communication will suffer delay on at least two backhaul links (e.g., TP0 and TP2a or TP1 and TP2b). Delay on one link may also be caused by processing time needed by the IAB, if it processes signaling for forwarding or routing or relaying.

Figure 4:
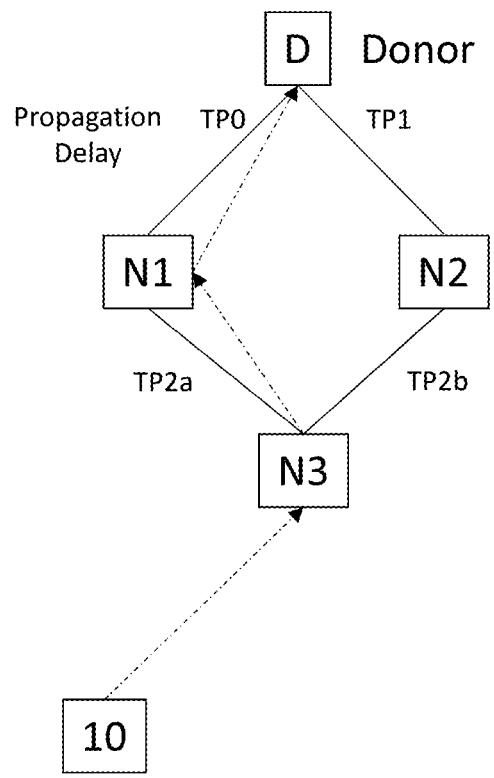
FIG. 4, showing a scenario with multiple IAB parents with one signaling path.

FIG. 4 shows an example in which communication from a terminal 10 is routed via one path running via N3 and N1. The communication between terminal 10 and IAB node N3 is via an access link, and then is routed via backhaul links between N3 and N1, and from N1 to D.

Figure 5:
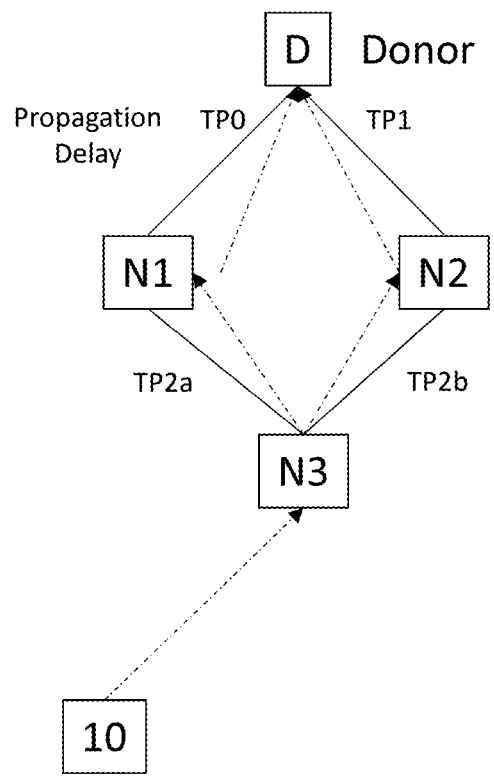
FIG. 5, showing a scenario with multiple IAB parents with two signaling paths.

FIG. 5 shows an example in which communication from a terminal 10 is routed via two paths, one running via N3, N1 and D, and one via N3, N2 and D. It should be noted that N3 is a child to both N1 and N2, and will receive physical layer control information from both parents N1, N2 independently, pertaining to each backhaul link it participates in as child. It should be noted that for a child with multiple parents, not all backhaul links have to be used for communicating data (e.g., carrying data from or for a terminal), but a backhaul link may be kept in reserve, e.g. established and/or maintained and/or set to sleep or idle, temporarily. However, it may be considered that signaling for a terminal, or for different terminals, is distributed over time between different backhauls. The use of multiple parents may provide improved reliability and/or a possible fallback. In some cases, different backhaul links may be used for different channels and/or communications and/or terminals based on reliability or quality requirements, and/or latency requirements and/or service agreements. A connection via a backhaul link may be in RRC idle and/or in DRX and/or may be upheld by regularly providing reference signaling and/or control signaling, even if no data signaling or signaling for or from a terminal is to be carried on the backhaul link.

Figure 6:
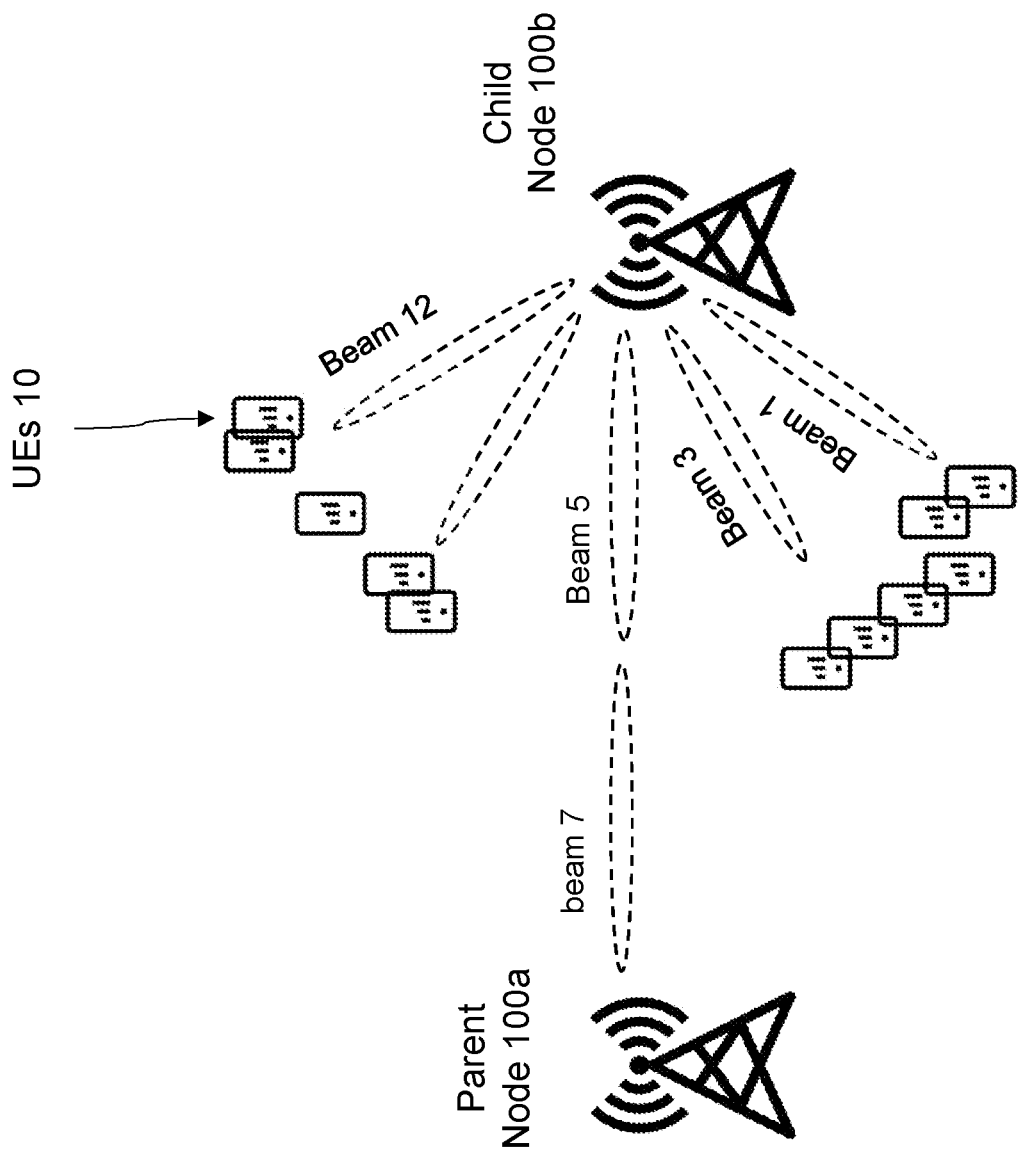
FIG. 6, showing an exemplary beam sweeping scenario.

FIG. 6 shows an exemplary beam sweeping scenario. A first IAB node 100b is shown to be in a communication link with a second IAB node 100c; the first IAB node may be a child node, the second IAB node a parent node. The first IAB node 100b may be scheduled for beam sweeping with beams 1 to 12 (or another number of different beams). The communication link between nodes 100a, 100b may comprise a signaling beam used by the node 100b (for transmission) and a corresponding beam for reception by the node 100a. In the example, these beams correspond to beams numbered 5 and 7, respectively. It should be noted that each node in a communication link may use the same or different beams for transmission and reception; herein, the beam used for transmission by node 100b and for reception by node 100a are particularly interesting. The signaling beam 5 may correspond to a sweeping beam (or be identical). The IAB node 100b may perform beam sweeping to provide synchronisation signaling to UEs 10 in its coverage area; as the communication link to IAB node 100a may be quite stable, it may be unnecessary to provide synchronisation signaling with a beam corresponding to signaling beam 5. Accordingly, the synchronisation signaling may be replaced by other signaling providing beam- or link-specific information to the IAB node 100a.

Additional synchronisation signaling may be considered to be implemented as follows: A first IAB node (IAB 1) may transmit additional synchronisation signaling generally periodically, with a first signaling pattern with a periodicity P1. The first pattern may be interrupted at a time domain location IR1 (also referred to as interruption location or interruption occasion or reception occasion), at which IAB 1 does not transmit synchronisation signaling, but may receive synchronisation signaling from another IAB node like IAB 2. IAB 2 transmit synchronisation signaling SSB also generally periodically, with a second signaling pattern with a periodicity P2. The second pattern may be interrupted at a time domain location IR2, at which IAB2 does not transmit synchronisation signaling, but may receive synchronisation signaling from another IAB node like IAB1. The SSB signaling provided by IAB nodes in general may be the same (e.g., to provide cell extension) or different, e.g. if each IAB node has its own cell with its own cell ID (the cell ID may be encoded in the synchronisation signaling, e.g. PSS and/or SSS). Other forms of patterns may be considered, e.g. periodic patterns that are shifted against each other. In general, the patterns may be such that at least once in a pattern one IAB node may receive synchronisation signaling from other one or more other IAB nodes. In some cases, the patterns may be such that occasionally, the interruption locations of different IAB nodes coincide. Thus, an IAB node that receives SSB from another IAB node over reception occasions thus might not receive such signaling at certain occasions. Thus, there may be a reception pattern of synchronisation signaling with one or more holes in it. The replacement signaling may be provided on reception occasions of the second radio node (e.g., specifically, if the IAB node is informed about the occasions, e.g. by the IAB donor and/or parent node and/or CU function).

Figure 7:
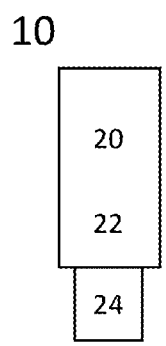
FIG. 7, showing an exemplary radio node implemented as terminal or UE.

FIG. 7 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 8:
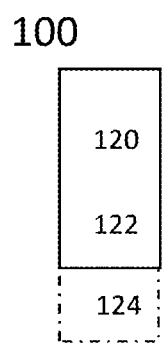
FIG. 8, showing an exemplary radio node implemented as network node.

FIG. 8 schematically show a radio node 100, which may in particular be implemented as a network node 100, for example an eNB or gNB or similar for NR, and especially as an IAB node. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Figure 9:
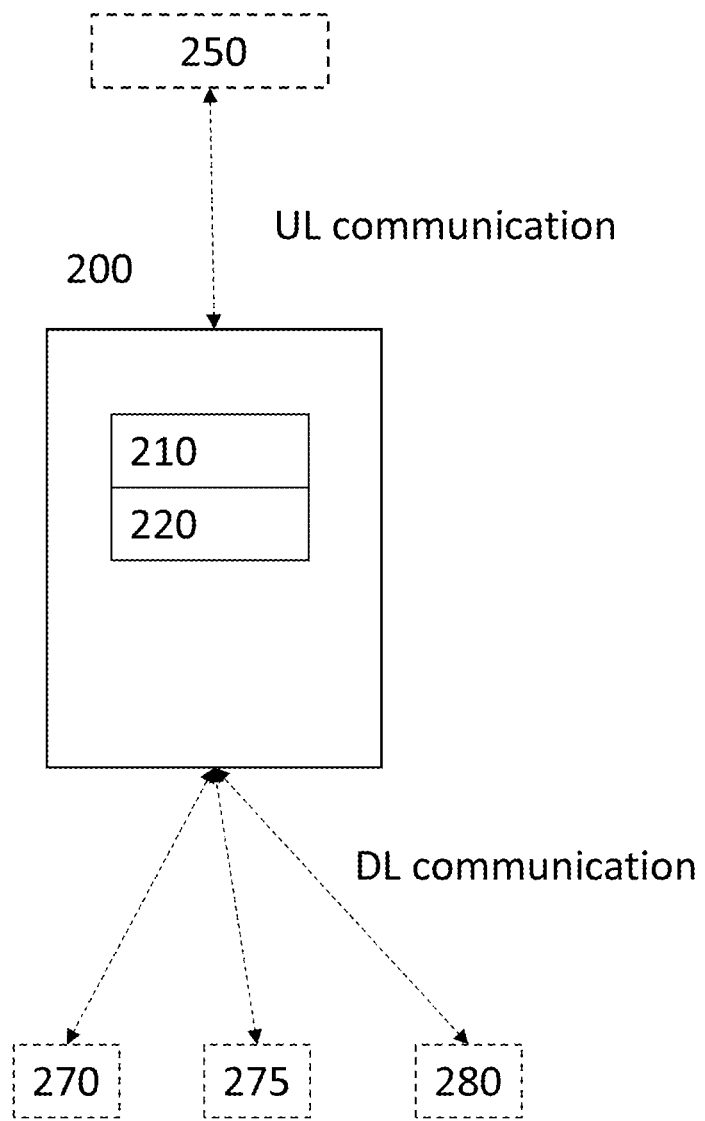
FIG. 9 showing an exemplary IAB node.

FIG. 9 shows an exemplary IAB node 200, which may be considered a form of radio node. The IAB node may in general be adapted for providing radio access to one or more terminals or UEs, and to communicate via a backhaul link with another IAB node, e.g. by providing the backhaul link, or by using it as a child node. A donor node may be considered a form of IAB node. From an IAB node's of view, UL communication may be communication via a backhaul link provided by a parent node 250, which may comprise UL and DL components itself, from and to the IAB node 200. DL communication may be communication via a backhaul link provided by the IAB node itself, or an access link provided by the IAB node, e.g. to terminals 270, 275 or IAB (child) node 280. This DL communication may also have UL and DL components, to and from the IAB node 200. The IAB node may be a radio node, which may comprise radio circuitry and/or processing circuitry and/or antenna circuitry and/or an antenna arrangement and/or other circuitry, as described for radio nodes in general. In particular, it may comprise circuitry 210 corresponding to terminal functionality 210 (also referred to as MT), and circuitry 220 corresponding to IAB control functionality (also referred to as DU). An IAB node that is a donor node may in some variants comprise circuitry corresponding to higher layer functionality, which may be also referred to as CU functionality. An IAB node may be adapted to carry out and/or control any of the methods described herein.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or formats for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and/or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node or IAB node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling.

Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control)

signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some Useful Abbreviations Comprise

| Abbreviation | Explanation |
| --- | --- |
| ACK/NACK | Acknowledgment/Negative Acknowledgement |
| ARQ | Automatic Repeat request |
| BER | Bit Error Rate |
| BLER | Block Error Rate |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(—)RS | Demodulation reference signal(ing) |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PBCH | Physical Broadcast Channel |
| PDCCH | Physical Downlink Control Channel |
| PDSCH | Physical Downlink Shared Channel |
| PRACH | Physical Random Access Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| PSS | Primary Synchronisation Signaling |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SS | Synchronisation Signaling |
| SSB | SS/PBCH block |
| SSS | Secondary Synchronisation Signaling |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. Method of operating an Integrated Access and Backhaul (IAB) node in a wireless communication network, the IAB node being in a communication link with a second IAB node using a signaling beam, the IAB node further being scheduled to perform beam sweeping with a plurality of synchronisation beams, one of the synchronisation beams corresponding to the signaling beam; wherein a synchronisation beam is scheduled to carry synchronisation signaling; and wherein the method comprises performing beam sweeping such that the synchronisation beam corresponding to the signaling beam carries information signaling replacing the synchronisation signaling at least in part.

2. Program product comprising instructions adapted for causing processing circuitry to control and/or perform a method according to claim 1.

3. Carrier medium arrangement carrying and/or storing a program product according to claim 2.

4. Integrated Access and Backhaul (IAB) node for a wireless communication network, the IAB node being adapted for communicating in a communication link with a second IAB node using a signaling beam, the IAB node further being adapted for being scheduled to perform beam sweeping with a plurality of synchronisation beams, one of the synchronisation beams corresponding to the signaling beam; wherein a synchronisation beam is scheduled to carry synchronisation signaling; and wherein the IAB node is adapted for performing beam sweeping such that the synchronisation beam corresponding to the signaling beam carries information signaling replacing the synchronisation signaling at least in part.

5. The node according to claim 4, wherein the communication link comprises a beam pair comprising the signaling beam.

6. The node according to claim 4, wherein synchronisation signaling corresponds to and/or comprises SS/PBCH block signaling.

7. The node according to claim 4, wherein the information signaling is transmitted on a resource structure corresponding to a resource structure used for synchronisation signaling.

8. The node according to claim 4, wherein the information signaling indicates timing information, e.g. timing information pertaining to the communication link and/or to a southbound link of the IAB node.

9. The node according to claim 4, wherein the information signaling replaces primary synchronisation signaling and/or secondary synchronisation signaling and/or demodulation reference signaling and/or broadcast channel signaling.

10. The node according to claim 4, wherein the information signaling indicates power control information.

11. The node according to claim 4, wherein the information signaling is transmitted using the same modulation as the synchronisation signaling.

12. The node according to claim 4, wherein the information signaling indicates a resource misalignment parameter.

\* \* \* \* \*